United States Patent [19]

Dutton

[11] Patent Number: 5,228,736
[45] Date of Patent: Jul. 20, 1993

[54] TRUCK BOX TOP MOLDING

[76] Inventor: Virgil R. Dutton, 5739 W. Del Rio St., Chandler, Ariz. 85226

[21] Appl. No.: 794,456

[22] Filed: Nov. 19, 1991

[51] Int. Cl.⁵ ............................................. B62D 33/02
[52] U.S. Cl. ................................. 296/39.2; 410/104; 410/110; 296/100
[58] Field of Search .............. 296/100, 39.2; 410/110, 410/115, 104

[56] References Cited

U.S. PATENT DOCUMENTS

| | | | |
|---|---|---|---|
| 3,722,910 | 3/1973 | Heckenlaible | 410/104 |
| 4,191,108 | 3/1980 | Jones | 410/110 |
| 4,248,558 | 2/1981 | Lechner | 410/115 |
| 4,575,146 | 3/1986 | Markos | 296/39.2 |
| 4,650,382 | 3/1987 | Johnson | 410/110 |
| 4,792,179 | 12/1988 | Stevens | 296/100 |
| 4,796,914 | 1/1989 | Raynor | 280/757 |
| 4,838,602 | 6/1989 | Nett | 296/100 |
| 4,936,724 | 6/1990 | Dutton | 410/110 |

*Primary Examiner*—Robert R. Song
*Attorney, Agent, or Firm*—Woodard, Emhardt, Naughton, Moriarty & McNett

[57] ABSTRACT

Rails are mounted to the tops of the sides, ends and tailgate of a pickup truck box. Each rail has an outwardly extending base resting on the top of the truck box. The rails are fastened to the box by screws extending through holes in the rails and outwardly into the inside wall of the truck box at the sides and ends. An upstanding, longitudinally-extending flange in an internal cavity in each of the side rails receives the hooked outer end of longitudinally movable anchors having clamping screws with knurled knobs thereon to clamp the anchors to the rails in any of an infinite number of possible positions longitudinally of the rails. Apertures in the anchors receive cargo strap or chain hooks or partition connectors or other accessories. An upwardly opening longitudinally extending groove in each of the side and end rails receives and secures a reinforced hem of a tonneau cover.

21 Claims, 9 Drawing Sheets

TRUCK BOX TOP MOLDING

BACKGROUND OF THE INVENTION

This invention relates generally to pick-up trucks, and more particularly to a decorative edge molding for the truck box to serve as a protective member and also to facilitate cargo tie-down and covering.

Modern pick-up trucks, particularly of the so-called "fleet" side body design, have a generally rounded and inwardly turned upper edge of the truck box. The appearance of it is quickly marred where the user drags cargo over the side rather than opening the tailgate to load and unload it. Also, there is rarely a very convenient means for fastening down cargo, or separating cargo items, or mounting baskets or other in-bed carriers for cargo. Similarly, it is not very convenient to reliably and neatly secure a tonneau cover. The present invention is directed to an improvement of the foregoing conditions.

SUMMARY OF THE INVENTION

Described briefly, according to a typical embodiment of the present invention, an elongate rail is provided along each side of the truck box at the upper ed9e thereof. It has a cross sectional shape having some similarity to the numeral "4", with the primary horizontal arm thereof providing the horizontal mounting face of the rail resting on the upper edge of the truck box. The outside face of the leg of the "4" is placed against the inside wall face of the truck box adjacent the upper edge of the box and is fastened to the box by screws extending through holes in the rail leg and outwardly into the inside wall of the truck box at the upper edge. There is a longitudinally extending flange inside the rail and upstanding from the arm of the rail. This flange receives the hooked end of an anchor which extends from the hooked end inside the rail, through a longitudinally extending slot in the rail and into the truck box. The anchor end exposed in the truck box has an aperture in it to receive the truck cargo hold-down strap hooks. There are as many anchors as needed to secure the cargo. Each anchor is secured against the flange by a clamp which is releasable to enable moving the anchor longitudinally to any desired location along the rail. The upper edge of the rail has a longitudinally-extending tonneau cover-receiver groove in it. A tonneau cover is provided with a reinforced hemmed edge which is stuffed into the groove and thereby securely retained to cover cargo in the truck box. In addition to the side rails, end rails of similar construction are employed at the front end wall of the truck box and at the top of the tailgate. The side and end rails have outward facing recesses in them to receive decorative treatment.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
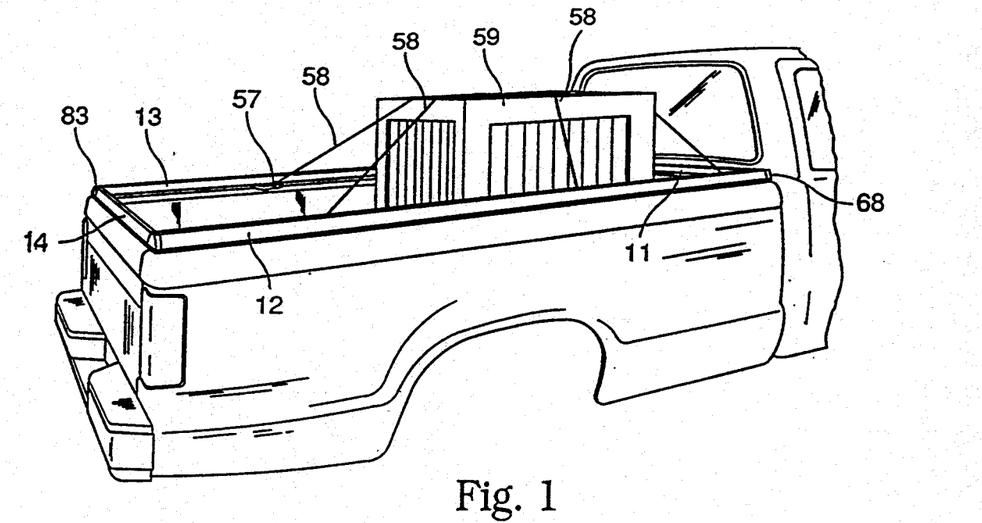
FIG. 1 is a pictorial view of a pick-up truck shown fragmentarily, with the truck box top molding of the present invention mounted to the truck box.

Referring now to the drawings in detail, the pick-up truck has the edge moldings of the present invention mounted to the walls defining the truck "box." The description will generally use the words "outer" and "inner" to designate whether the feature is toward the outside or inside, respectively, of the truck box. The edge moldings of the present invention are mounted to the front wall at 11, the right side wall at 12, the left side wall at 13, and the tailgate at 14. The moldings mounted to the sides of the truck box are identical, and the moldings mounted to the front of the box and to the tail gate are identical and similar to the side moldings. They are mounted to the upper edges of these walls as better shown in FIG. 2 where it is shown that the left side wall of the truck includes a double wall construction having an outer panel 16 and inner panel 17, both of which are turned inwardly toward the truck box and then downwardly at 18 where they are welded together and then outwardly at 19. The same type of construction is used at the other side, and the front end of the truck box, and at the tailgate. The molding 13 is a longitudinally extending rail of extruded aluminum and which has a straight and generally flat but slotted inside face 21U, 21L extending the full height and length of the rail. It has a longitudinally extending slot 22 whose lower edge is defined by the upper face of wall 23 which extends outwardly from face 21L. Flange 24 extends upwardly from and perpendicular to the wall 23 inside the rail and coextensive with the length of the rail. The outer wall 26 extends in a smooth curve from the outer end of the wall 23 upward and inward toward the upper edge of the inside face 21U. Thus it can be seen that the walls 21U, 21L, 23 and 26 form a cross sectional configuration similar to the arabic numeral "4." An upwardly opening and longitudinally extending slot 27 is located adjacent the intersection of outer wall 26 with the upper edge of face 21U. The faces 21U and 21L have longitudinally extending ribs 28 thereon, two such ribs on each face and coextensive with it. A recess 29 is provided on the outer face of the outer wall 26 and extends the full length of the rail and receives a decorative insert 31 therein.

Figure 2:
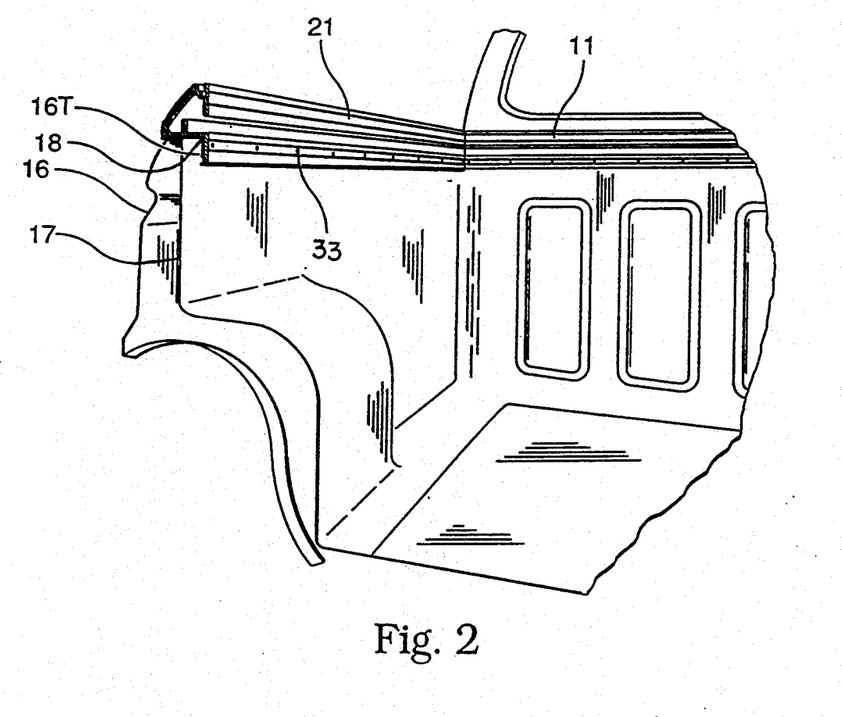
FIG. 2 is an enlarged fragmentary pictorial view showing details of the mounting of the molding in the box of the pick-up truck.
Figure 3:
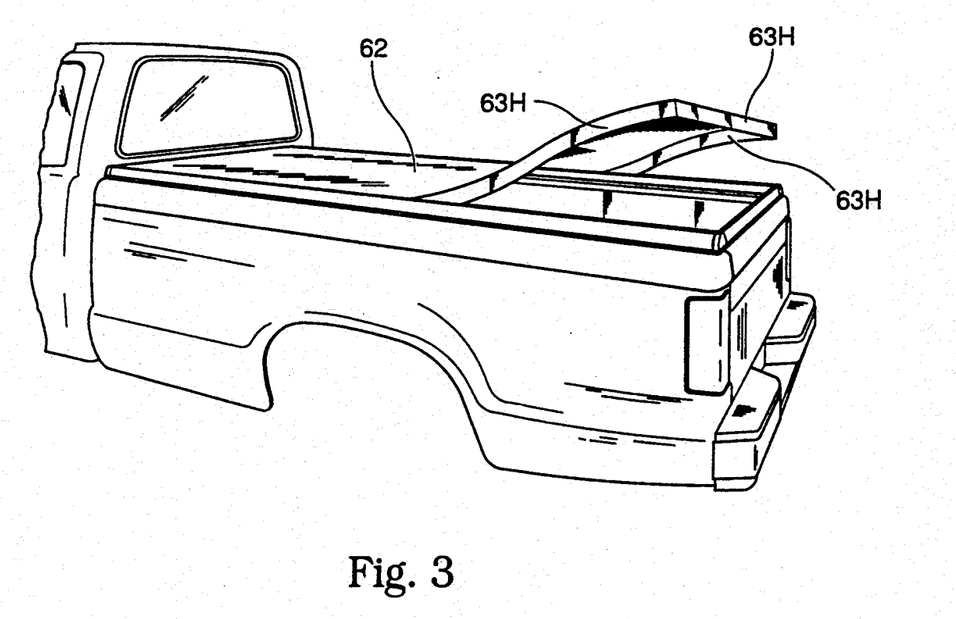
FIG. 3 is a pictorial view with the tonneau cover partially in place.

The bottom of wall 23, and the stub flange 32 projecting downward from the outer lower edge of wall 23, rest on the top edge 16T of the truck box side wall panel 16. The downwardly extending leg portion of the rail below the slot 22 is fastened to the truck box side wall by means of a series of screws 33 longitudinally spaced and received in countersunk holes in the rail. These are flat headed screws which may be provided with a screw driver slot or Phillips or Torx or Allen or other type of tool receiving socket. They are of the self-threading type so that, although they freely fit into the holes in the rails, these screws will tightly thread their way through smaller holes provided in the truck box wall inner flange 18 and secure the rails to the truck box side. The holes in the truck box portion 18 can be drilled at the time of installation of the edge molding rails, with the pre-formed holes in those rails serving as excellent hole locators and drill guides. As an alternative fastening system, machine screws with lock nuts or conventional nuts and lockwashers can be used.

Figure 6:
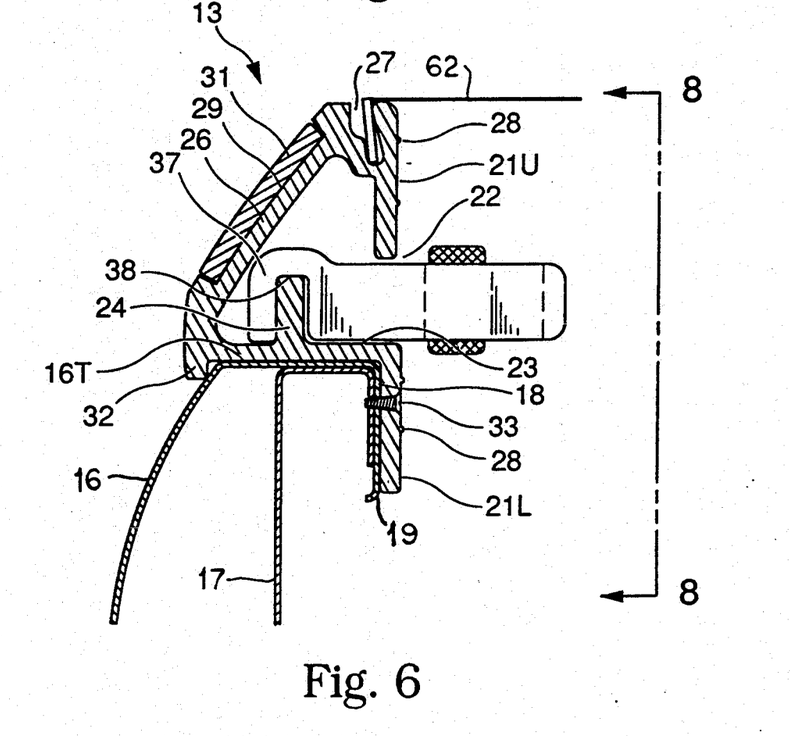
FIG. 6 is a cross sectional view at line 6—6 in FIG. 5 and viewed in the direction of the arrows.
Figure 9:
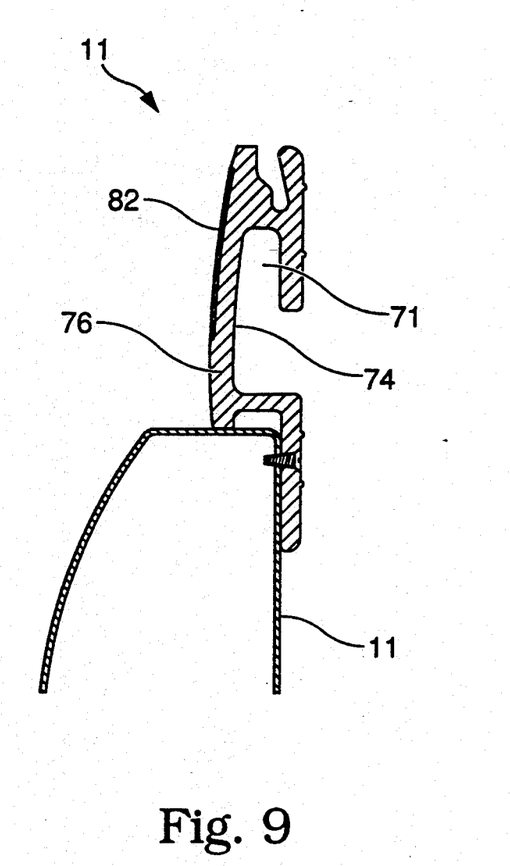
FIG. 9 is a cross sectional view of the truck box end rail.

The end rails are very similar to the side rails as will be evident by comparing the end rail cross section shown in FIG. 9 with the side rail cross section shown in FIG. 6. The end rails 11 and 14 are identical to each other. They are of the same height as side rails 12 and 13. They are mounted to the front end of the truck box and to the tail gate in the same way as the side rails are mounted. But they are not as wide as the side rails, since They do not serve to attach the load control anchors which will be described now.

Figure 4:
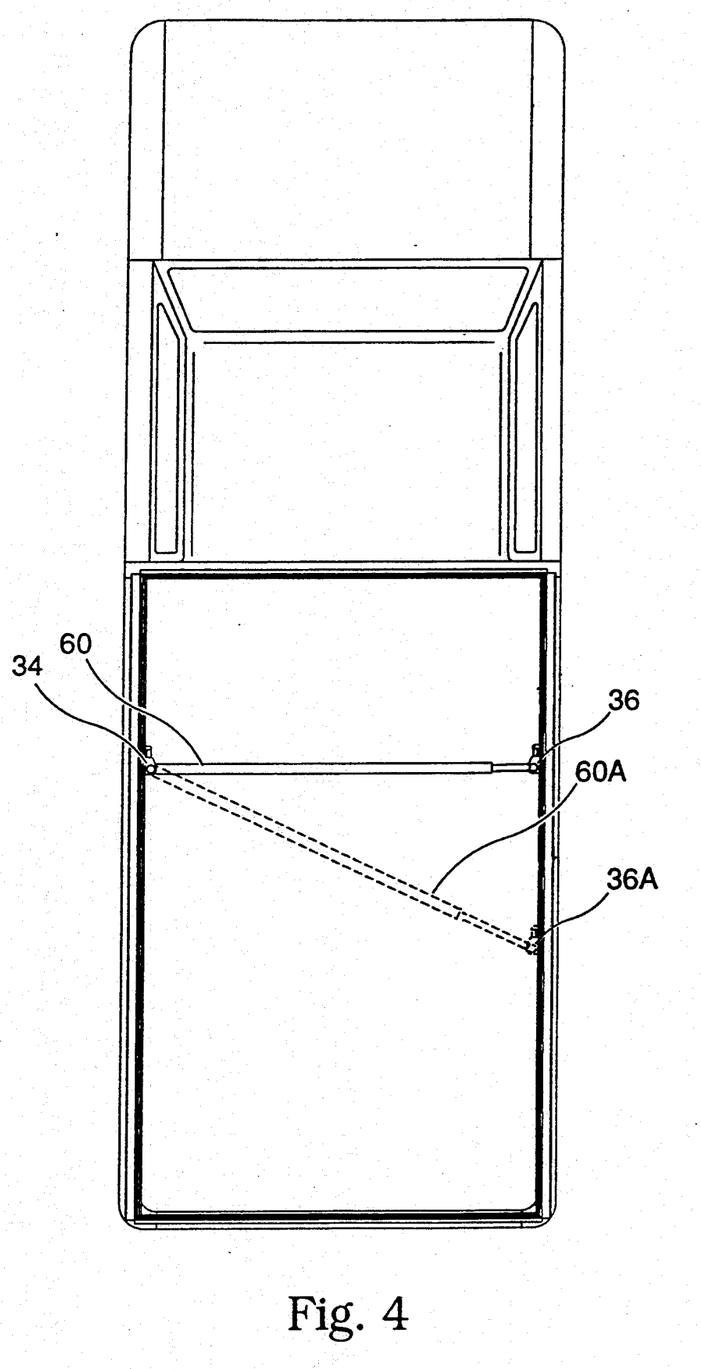
FIG. 4 is a fragmentary plan view showing several positions of an adjustable transverse accessory bar.
Figure 5:
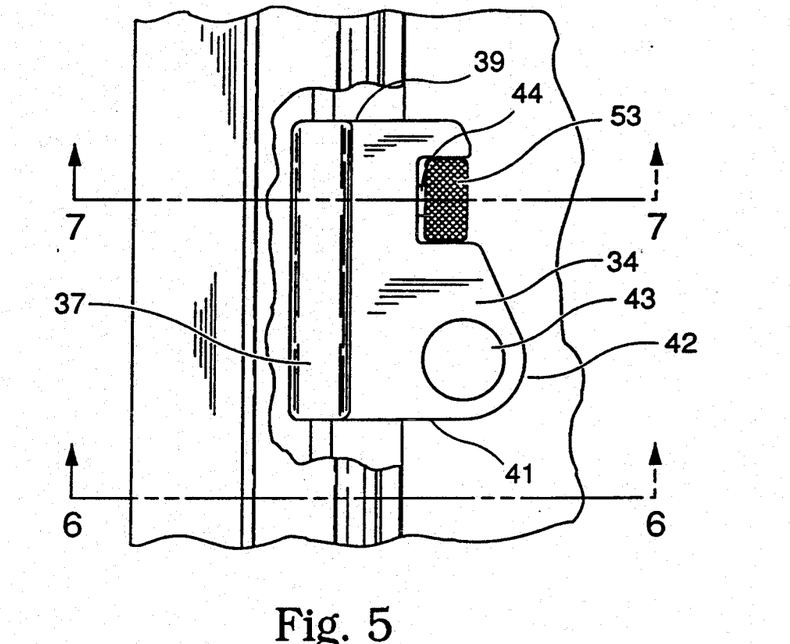
FIG. 5 is an enlarged fragmentary plan view of one of the load control strap anchors secured in the molding installed on the truck box.
Figure 7:
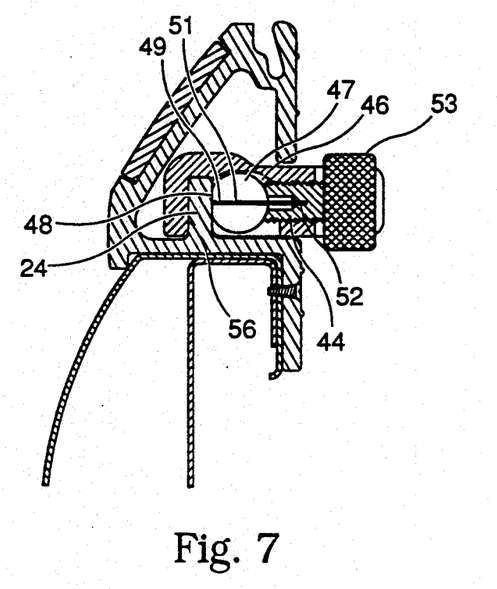
FIG. 7 is a cross sectional view at line 7—7 in FIG. 5 and viewed in the direction of the arrows.
Figure 8:
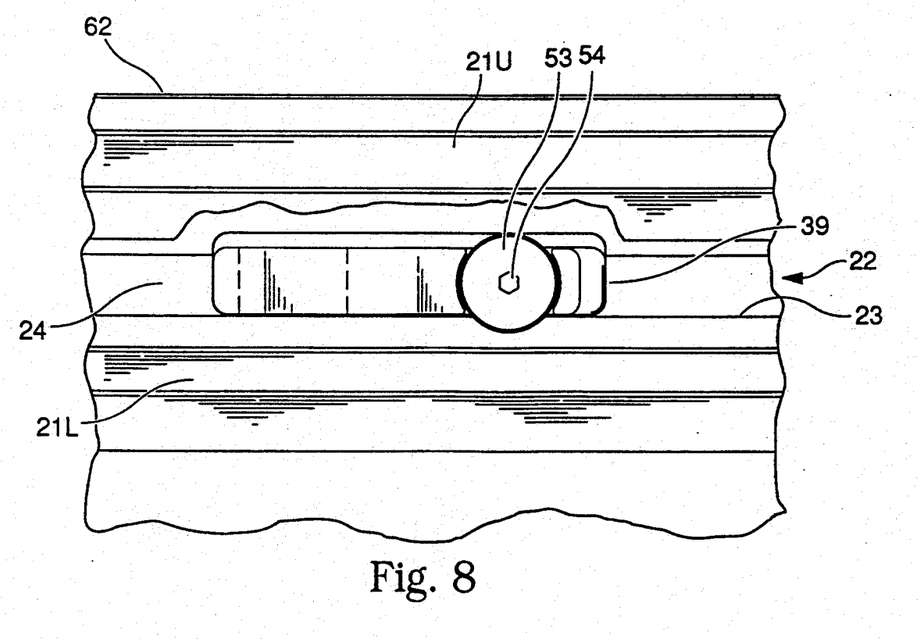
FIG. 8 is an elevational view of the anchor installation taken at line 8—8 in FIG. 6 and viewed in the direction of the arrows.

In order to provide convenient and various means for controlling loads that may be placed in the box of a pickup truck, and for other purposes, a system of anchors is employed according to a feature of this invention. Two of them are shown at 34 and 36 in FIG. 4. These anchors can be identical, if desired, or they can be made in a left-side and a right-side style if desired. A description of anchor 34 will suffice in any case. An enlarged top plan view thereof is shown in FIG. 5 and sections therethrough are shown in FIGS. 6 and 7, while FIG. 8 shows a view thereof as the anchor appears when looking from the inside of the truck box toward the side of the truck. As shown in FIGS. 6 and 7, the anchor includes a downwardly opening hook portion 37 in which the downwardly opening channel 38 thereof is received on rail flange 24. This channel or groove 38 extends the full length of the anchor from the front end 39 (FIG. 5) to the rear-end 41. While the outside portion of the anchor is hooked as shown, the inside portion 42 has a vertically extending aperture 43 through it to receive a rope or a cargo tie-down strap hook or the like.

The anchor is provided with a clamp device which includes a thumb screw 44 threaded into the anchor and extending into a cavity 46 which houses a clamp ball 47 having a flat outer face 48 which engages the inner face of the flange 24. A portion of the ball 47 and adjustment screw 44 are broken out in FIG. 7 to show a central aperture 49 through the ball and which slidingly receives a 0.060 inch diameter spring wire 51 which is press fitted into the outer end of the screw 44 at 52. The outer end of the screw has a conical seat receiving the spherical surface of the ball. The inner end of the screw has a knurled knob 53 thereon having an Allen socket 54 (FIG. 8) on the inner face thereof for reception of an Allen wrench for tightening. The cavity 46 opens at the bottom of the anchor to enable assembling the ball with the screw and anchor before sliding the anchor into place in the rail from the rear-end of the rail when installed on the truck box. When the anchor has been moved to the position lengthwise of the rail where it is desired to locate it and fix it, the screw is turned to apply the clamp ball to the inside face of flange 24 whereupon the face 56 of the anchor hook-channel 38 is pulled tight against the outside face of the flange 24 whereupon the anchor is clamped to the flange. Further tightening can be achieved by use of an Allen wrench. This anchor and a counterpart anchor such as 36 can be used to receive hooks such as 57 (FIG. 1) at the ends of anchor tie down cables or straps 58 to secure the cargo 59 in the truck box. In addition, they can be used to secure load control cross bars such as bar 60 in FIG. 4. This bar is telescopically adjustable by operation of the nut 61 thereon so that, if desired to place the bar at some angle other than perpendicular to the sides and molding rails as shown in the dotted lines at 60A in FIG. 4, the anchor 36 can be loosened and moved to the position shown by the dotted line 36A and the telescopic cross bar extended enough to accommodate the additional distance, and then the anchor can be clamped so as to securely position the cross bar at an angle as shown in FIG. 4. Thus the anchors can be repositioned as desired and also used for other purposes such as holding partitions to separate categories of cargo in the truck box. Another use is for the mounting of support bows or the like for a tonneau cover if desired. While the centering spring 49 tends to keep the flat face of the ball parallel with the face of the flange 24, to facilitate intentional sliding of the anchor hook portion in the passageway when the adjustment screw is loosened, the combination of the centering spring, conical seat and flat face 48 on the ball will result in automatic tightening of the grip of the ball on the flange if an attempt is made to slide the anchor when the adjustment screw is only finger tight. In this way there is additional security against load shifting even if the operator of the truck has failed to tighten the adjustment screws with a wrench.

Figure 10:
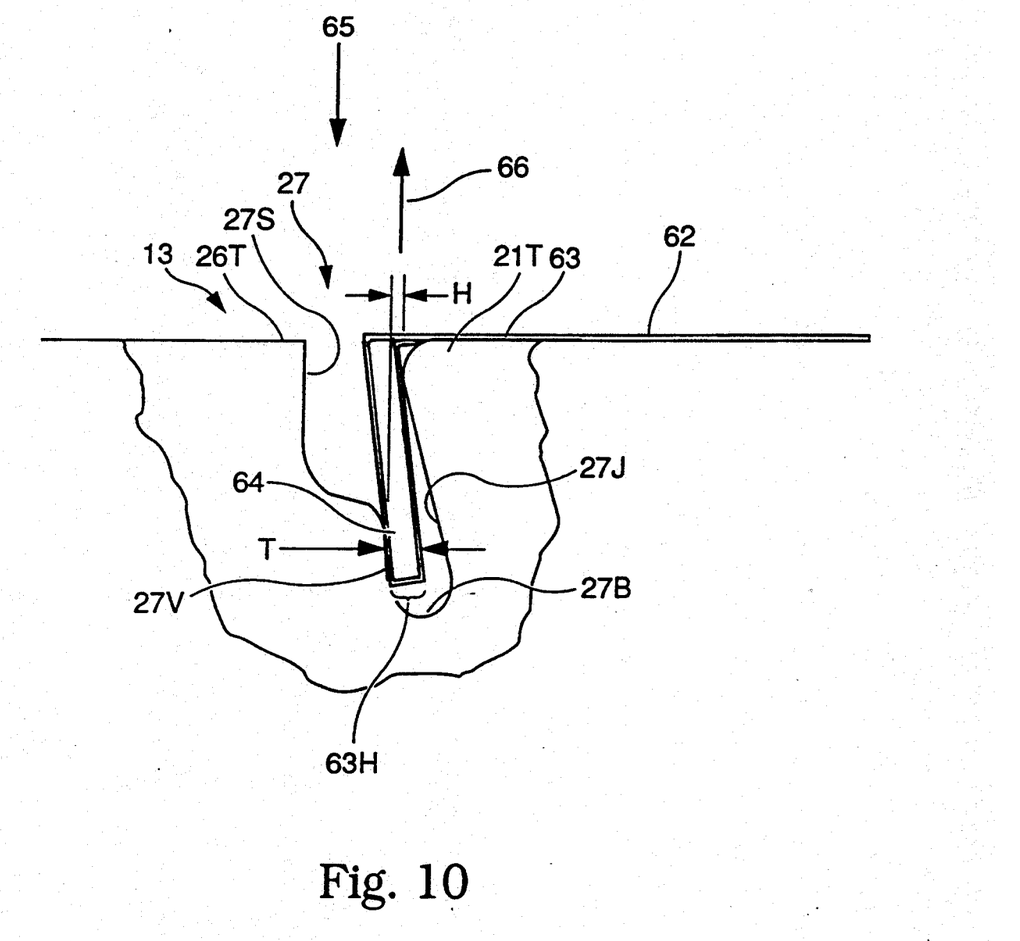
FIG. 10 is an enlarged fragmentary cross section through the tonneau cover edge holding slot in a molding rail.

FIG. 10 better shows the detail of the slot 27 for reception of the tonneau cover edge and the mounting of the cover therein. The slot 27 has the entry at the upper margin 26T of wall 26, and at the upper edge 21T of wall 21. The slot has a wall 27J which slopes downwardly and inwardly (with respect to the truck box) at about a 10° angle as shown in FIG. 10, and then turns outwardly and upwardly to form the bottom 27B and then upwardly and inwardly again to a vertical wall 27V and then turns outwardly and then upwardly at 27S and extends vertically to the top 26T of the rail outer wall at the opening of the slot 27.

The tonneau cover itself includes the sheet 62 of a suitable fabric having a hem at each of its sides and the front and rear ends. It is stitched as at 63 to form the hem 63H which snugly encloses a reinforcing rib or stiffener strip 64 which may be made of nylon, for example. This strip is thick enough that, when the hem is pushed down into the slot 27 in the direction of arrow 65, it is disposed at a downwardly and inwardly directed incline such that any tendency of it to move upward in the direction of arrow 66 would tend to tighten the tonneau material at 62 and thus resist upward movement of the hem out of the slot. This is accomplished by having the horizontal distance (dimension "H" in FIG. 10) from the vertical projection of the slot wall 27V up to the vertical projection of the inner margin of the slot at wall 21T be less than the thickness (dimension "T" in FIG. 10) of the hem. This is done at all of the four slots, two of them in the side rails and two of them in the end rails.

Figure 11:
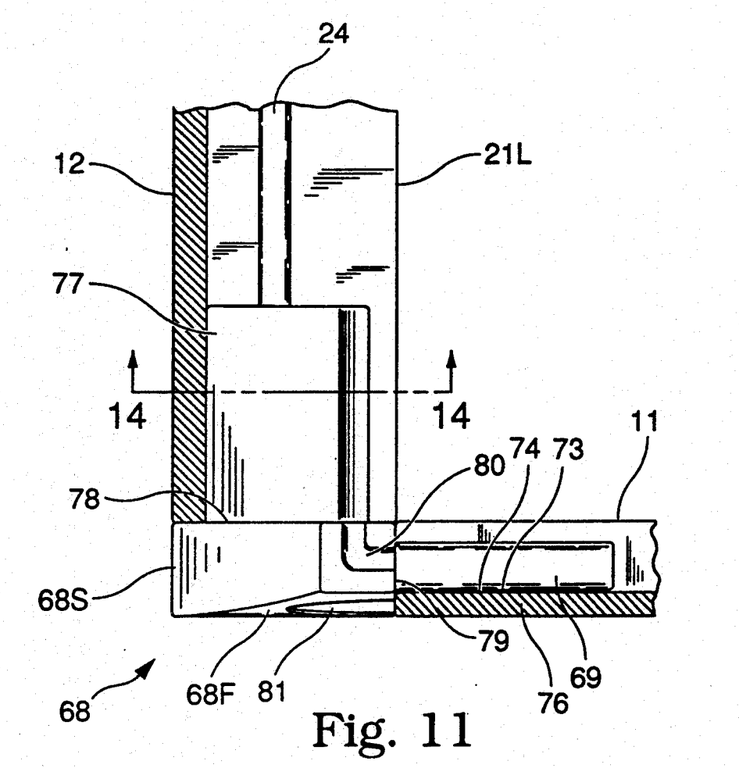
FIG. 11 is a top plan view of a rail end cap corner unit.
Figure 12:
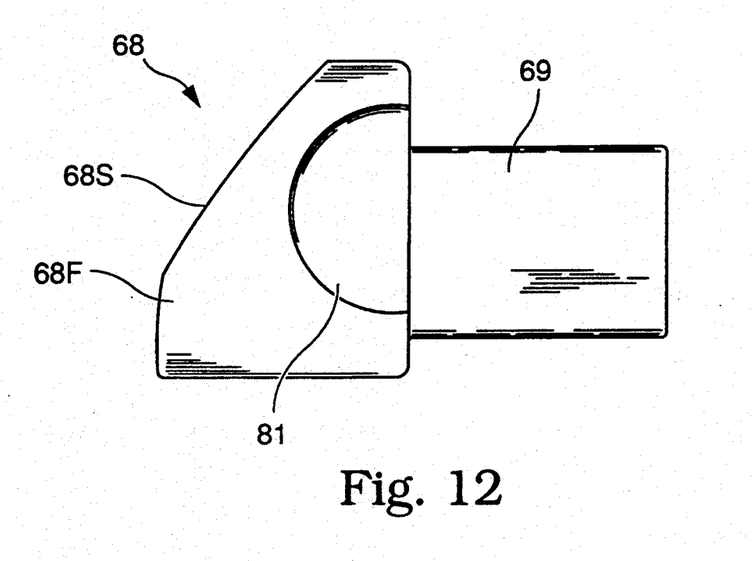
FIG. 12 is a front elevational view thereof.
Figure 13:
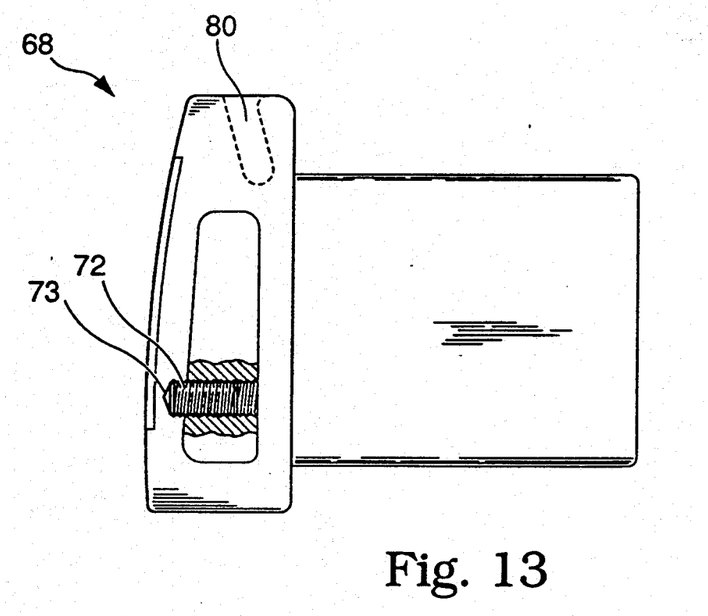
FIG. 13 is a side elevational view thereof.
Figure 14:
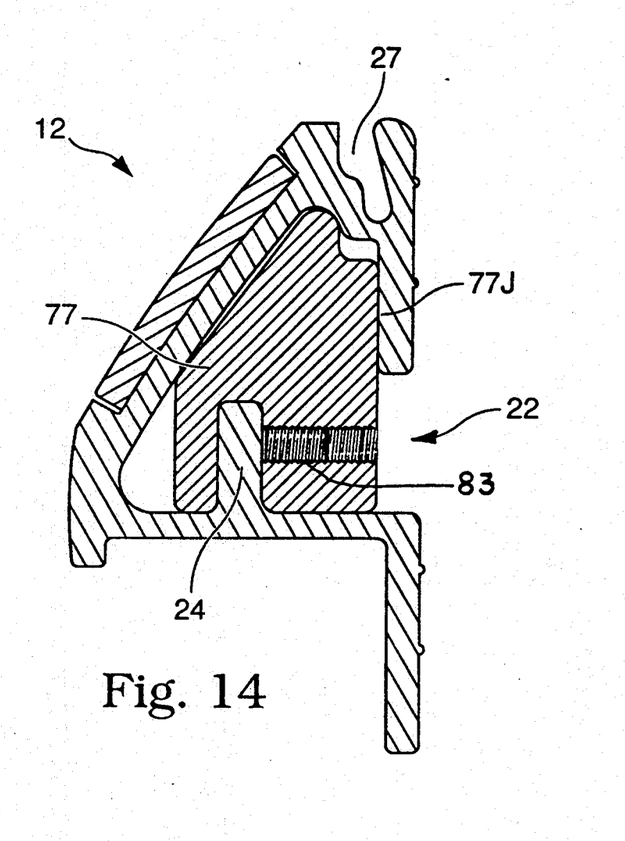
FIG. 14 is a cross section through the side rail with the end cap (corner bracket) arm received therein and secured by set screw.

Each of the rails is cut off square at its opposite ends. Corner brackets and end caps are provided to neatly finish off the corners and ends of the rails FIGS. 11, 12 and 13 show the corner bracket (cap) 68 (FIG. 1) for the front end of rail 12. In FIGS. 11 and 14 it is shown installed in the right side rail 12 and front rail 11, both shown fragmentarily. For orientation purposes, the front face 68F of the corner bracket should be understood to be facing forward toward the cab of the truck. The side face 68S should be understood to be facing outward on the right-hand side of the truck box at the right front corner of the truck box. The arm 69 is received in the cavity 71 (FIG. 9) of the front end rail. It includes a set screw 72 threadedly received therein and having a tip 73 engaging the inside face 74 of wall 76 of the front end rail 11. Similarly, the bracket 68 has an arm 77 which is pushed into the front end of rail 12 before fastening the rail to the truck box. It is a snug fit in the rail between the upper edge of flange 24 and the upper edge of the slot 22 and will readily remain in place due to the snug fit. Also, the arm 77 is secured in rail 12 by, in addition to the snug fit, the set screw 83 threadedly received in the arm 77 and engaging the inside face of flange 24 and pushing the inside wall 77J of arm 77 against the interior face of the rail wall above the slot 22. When the rails are fastened to the side and front walls, respectively, of the truck box, the rear face 78 of the corner bracket and the inside face 79 thereof are neatly and abuttingly engaged with the front end of side rail 12 and the right-hand end of front end rail 11, respectively. A top end slot 80 is provided in the end cap to receive the corner of the tonneau cover. This slot can be essentially the same shape as the slots in the side and end rails if a rigid hem portion of the tonneau cover is to be tucked into the slot. Otherwise it can be some other suitable shape merely to accommodate the corner of the tonneau cover and provide a weather tight receptacle for it at this corner. The recess 81 in the front face 68F of the corner bracket blends with the recess 82 in the front face of the end rail 11. This particular type of corner bracket is actually an end cap for the side and front rail so it can also serve as the rear end cap for rail 13 at 83. For that purpose, and in order the enable the tailgate to readily open and shut, the arm 69 is eliminated from that particular piece. But the arm 77 of the corner piece such as 68 is secured in the rear end of the rail 13 by, in addition to the snug fit, the set screw such as 83 threadedly received in the arm 77 and engaging the inside face of flange 24 and pushing the inside wall such as 77J of the end cap arm 77 against the interior face of the rail wall above the slot 22.

From the foregoing description, it should be recognized that the end caps for the left front of the truck box and the right rear of the truck box are of the same type of construction but mirror images of those already described for the right front and left rear of the truck box.

For purposes of example, the overall height of the rail wall 21U, 21L is about 3.60 inches. The thickness of the wall at 21U and 21L is about 0.20 inch and 0.18 inch, respectively. The total width of end rails is about 0.83 inch. The total width of side rails is about 1.94 inches. The "H" is about 0.047 inches. The hem thickness "T" dimension is about 0.060 inches.

The rails can be extrusions of a bright metal such as 6463 aluminum, bright dip anodized for color, if desired, and provide a durable, decorative, and functional edge molding for the pick-up truck box. Other materials, including durable plastics, might also be used. The decorative inserts 31 may be rubber or plastic or metal or any suitable material, with color or embossments of any suitable design. The material for the corner brackets (end caps) can be durable plastic or die cast aluminum.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

THE INVENTION CLAIMED IS:

1. Truck box molding comprising:
   an elongate rail having a height substantially greater than width,
   the rail having an inside face to face the interior of the truck box when the molding is installed on the top of the side wall of the truck box,
   the rail having an outside face to face away to the outside from the side wall of the truck box,
   the rail having an internal passageway throughout its length,
   the rail having an upstanding flange in the passageway and extending throughout the length of the rail, and
   the rail having a slot in the inside face and extending the length of the rail and communicating with the passageway.

2. The molding of claim 1 and wherein:
   the rail has a groove coextensive longitudinally with the rail and opening upwardly to a top-of-rail entrance to receive the edge of a tonneau cover.

3. The molding of claim 2 wherein:
   the groove has an inner margin defined by an outwardly facing wall that begins at the entrance and slopes downwardly and inwardly toward said inside face and then turns outwardly and upwardly into a substantially vertical and inwardly facing wall and then turns outwardly and upwardly to the groove entrance at the top of the rail; and
   the horizontal space between the vertical downward projection of the outermost point of the outwardly facing wall and the vertical upward projection of the substantially vertical wall is less then the thickness of the marginal portion of the tonneau cover to be installed in the groove;
   whereby an outwardly facing margin of the tonneau cover can be confined to a downwardly and inwardly sloping attitude by the vertical wall.

4. An anchor system for cargo in a pickup truck box comprising:
   the molding of claim 1; and
   an anchor having a hook received on the flange and clamped to the flange in the passageway, the anchor having a portion extending out from the passageway through the slot and away from the inside face of the rail and having a receiver for a cargo anchoring member thereon.

5. The system of claim 4 wherein: the receiver is an aperture in the anchor.

6. The system of claim 5 wherein the anchor further comprises:
a clamp member rollable longitudinally in the passageway,
an adjustment screw engaging the clamp member,
an adjustment knob for manually turning the screw to apply and release the clamp member.

7. The system of claim 6 wherein the anchor further comprises:
a spring wire affixed to one of the screw and the clamp member and extending along the axis of the screw and passing through the center of the clamp member and holding the clamp member in alignment with the screw while permitting rotation of the screw during axial movement of the anchor in the passageway in the rail as the anchor is adjusted longitudinally in the rail while the hook is unclamped from the rail flange.

8. In a pick-up truck box having sides and an upper edge on each side, the improvement comprising:
box top molding including elongate side rails fastened to the sides of the box adjacent to the upper edge,
each rail having a laterally extending base coextensive longitudinally of the rail and covering at least part of the upper edge of the box,
each rail having a longitudinally movable anchor releasably clamped to the rail and having a receiver for cargo restrainer means thereon; and
each rail having a groove coextensive longitudinally with the rail and opening upwardly to receive portions of a tonneau cover therein.

9. The improvement of claim 8 and further comprising:
a tonneau cover having reinforced edges tucked into the upwardly opening grooves in the rails and thereby retained in position covering the truck box,
the grooves being shaped such that reinforced edges must move upwardly and outwardly for removal from the grooves in a direction tending to tighten the cover whereby removal is resisted by the cover.

10. The improvement of claim 8 wherein:
the box has a front wall and rear tailgate, each having an upper edge, and
the top molding includes end rails having upwardly opening grooves like the grooves in the side rails, one of the end rails being fastened to the front wall, the other of the end rails being fastened to the tailgate, with the end rails resting on the upper edges of the front wall and the tailgate.

11. The improvement of claim 10 and wherein:
the rails are metal extrusions.

12. The improvement of claim 10 and further comprising:
a tonneau cover having reinforced edges tucked into the upwardly opening grooves in the rails and thereby retained in position covering the truck box.

13. The improvement of claim 12 wherein:
the reinforced edges have reinforcing stays of generally flat rectangular cross section received and confined in marginal hems of the cover.

14. The improvement of claim 13 and wherein:
the side rails have a cross-sectional shape resembling the arabic numeral "4."

15. The improvement of claim 10 and further comprising:
corner brackets having arms received in the passageways of the side rails at the front ends of the side rails and having arms received in the opposite ends of the rail on top of the front end wall.

16. The improvement of claim 15 and further comprising:
end caps having arms received and secured in the passageways of the side rails at the rear ends of the side rails.

17. The improvement of claim 16 and wherein:
the corner brackets and end caps have upwardly opening grooves in the upper edges thereof in registry with the grooves in the rails with which the end caps and brackets are associated, the improvement further comprising a tonneau cover having margins tucked in the grooves of the rails and corner brackets and end caps and securely retained therein and covering the truck box.

18. A truck box top molding comprising:
an elongate member of substantially uniform cross-sectional shape throughout its length and having first and second generally upstanding faces, the second face having a longitudinally extending slot therein; and
an anchor member having a portion received in the slot and having a clamp screw assembly operable to clamp the received portion in the slot,
the anchor member being movable longitudinally in the elongate member while the received portion is in the slot but unclamped.

19. The molding of claim 18 and wherein the clamp screw assembly includes:
a screw in the anchor member and which has a thread axis generally perpendicular to a longitudinal axis of the elongate member, and which has a proximal end and a distal end; and
a lug mounted at the distal end of the screw and engageable with the elongate member to clamp the portion of the anchor member received in the slot, to the elongate member.

20. The molding of claim 19 wherein:
the lug including a rolling surface that is circular about the screw axis and the lug has a clamping wall generally perpendicular to the screw axis; and
a spring wire is affixed to the screw and extends into the lug, the lug being rotatable thereon.

21. The molding of claim 20 and wherein:
the lug is a sphere and the clamping wall is a flat face perpendicular to the screw axis;
the screw has a cavity in the distal end engaging the sphere.

* * * * *